United States Patent
You et al.

(10) Patent No.: US 12,422,673 B2
(45) Date of Patent: Sep. 23, 2025

(54) MULTI-DOF MOVING STAGE AND DISPLAY APPARATUS INCLUDING THE SAME

(71) Applicants: SAMSUNG ELECTRONICS CO., LTD., Suwon-si (KR); SEOUL NATIONAL UNIVERSITY R&DB FOUNDATION, Seoul (KR); AJOU UNIVERSITY INDUSTRY-ACADEMIC COOPERATION FOUNDATION, Suwon-si (KR)

(72) Inventors: Jangwoo You, Seoul (KR); Kyujin Cho, Seoul (KR); Changkun Lee, Seoul (KR); Hongseok Lee, Seoul (KR); Jesung Koh, Suwon-si (KR); Yongmin Park, Seoul (KR); Sunpil Jeong, Seoul (KR)

(73) Assignees: SAMSUNG ELECTRONICS CO., LTD., Suwon-si (KR); SEOUL NATIONAL UNIVERSITY R&DB FOUNDATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 821 days.

(21) Appl. No.: 17/537,157

(22) Filed: Nov. 29, 2021

(65) Prior Publication Data
US 2022/0283435 A1 Sep. 8, 2022

(30) Foreign Application Priority Data

Mar. 8, 2021 (KR) .................. 10-2021-0030393

(51) Int. Cl.
*G02B 27/01* (2006.01)
*G02B 30/20* (2020.01)

(52) U.S. Cl.
CPC ..... *G02B 27/0149* (2013.01); *G02B 27/0172* (2013.01); *G02B 27/0176* (2013.01);
(Continued)

(58) Field of Classification Search
CPC ........... G02B 27/0149; G02B 27/0172; G02B 27/0176; G02B 27/0179; G02B 30/20;
(Continued)

(56) References Cited

U.S. PATENT DOCUMENTS 4,976,582 A * 12/1990 Clavel ................. B25J 9/1065
108/138
5,979,264 A * 11/1999 Rosheim ............. B25J 17/0266
74/490.06

(Continued)

FOREIGN PATENT DOCUMENTS

BR 102013026771 A2 * 8/2015
CN 203818136 U * 9/2014
(Continued)

OTHER PUBLICATIONS

Mike Szczys, Super-precise Light Painting from a Delta Robot, 2013, pp. 1-10 [online], [retrieved Aug. 31, 2024], retrieved from the Internet <URL: https://hackaday.com/2013/07/03/super-precise-light-painting-from-a-delta-robot/>. (Year: 2013).*

(Continued)

*Primary Examiner* — Jie Lei
(74) *Attorney, Agent, or Firm* — Sughrue Mion, PLLC

(57) ABSTRACT

A multi-degree of freedom (DOF) moving stage includes: an end-effector; three driven links pivotably connected to the end-effector at angular intervals from each other; three driving links pivotably connected to the three driven links, (Continued)

respectively; and three actuators configured to drive the three driving links, respectively. Each of the three driven links includes first to fourth arms arranged at intervals; and a flexible member that connects the first to fourth arms to each other in a parallelogram shape across the intervals and forms pivotable joints at the intervals.

17 Claims, 16 Drawing Sheets

(52) U.S. Cl.
CPC ......... *G02B 27/0179* (2013.01); *G02B 30/20* (2020.01); *G02B 2027/0134* (2013.01); *G02B 2027/0159* (2013.01)

(58) Field of Classification Search
CPC ............ G02B 30/33; G02B 2027/0134; G02B 2027/0159; G02B 27/01; G02B 27/017; G02B 27/0101; G02B 27/0103; G02B 2027/011; G02B 2027/0118; G03B 21/145; G03B 21/2033; G03B 21/2046; G03B 21/2073; G03B 21/20; G03B 21/14; B25J 9/0015; B25J 9/0051; B25J 9/10; B25J 9/106; B25J 9/1005; B25J 9/1065; B25J 18/005; B25J 18/06; B25J 17/0216; B25J 17/0266; B23Q 1/5462; F16H 21/46
USPC ................... 359/457, 13, 630–632; 345/7–9; 348/115, 118; 353/13, 28
See application file for complete search history.

(56) References Cited

U.S. PATENT DOCUMENTS

| | | | |
|---|---|---|---|
| 6,418,811 B1* | 7/2002 | Rosheim | B25J 17/0266 901/29 |
| 10,940,588 B2* | 3/2021 | Ludban | B25J 9/0009 |
| 11,059,166 B2* | 7/2021 | Crawford | |
| 11,945,111 B2* | 4/2024 | Gosselin | F16M 11/18 |
| 2006/0182602 A1* | 8/2006 | Schuler | B23Q 1/5456 414/735 |
| 2012/0103124 A1* | 5/2012 | Herder | B25J 9/0051 901/48 |
| 2013/0192396 A1* | 8/2013 | Quaid | |
| 2014/0083231 A1 | 3/2014 | Sutherland | |
| 2015/0128750 A1* | 5/2015 | Li | B25J 9/0051 703/7 |
| 2016/0158934 A1* | 6/2016 | Cao | B25J 17/025 74/490.05 |
| 2020/0338719 A1* | 10/2020 | Handfest | B25J 19/0004 |
| 2020/0361081 A1* | 11/2020 | Caron L'Ecuyer | B25J 9/106 |
| 2021/0132463 A1* | 5/2021 | Shin | G06T 19/006 |
| 2022/0009081 A1* | 1/2022 | Ceriani | B25J 9/0051 |
| 2022/0317463 A1* | 10/2022 | Urey | G02B 27/0103 |

FOREIGN PATENT DOCUMENTS

| | | | | |
|---|---|---|---|---|
| CN | 111331765 A | * | 6/2020 | ............ B25J 9/0009 |
| EP | 3173192 A1 | * | 5/2017 | ............ B25J 9/003 |
| KR | 101269187 B1 | * | 5/2013 | |
| KR | 10-2018-0001153 A | | 1/2018 | |
| WO | WO-2018025241 A2 | * | 2/2018 | ............ B25J 9/0051 |
| WO | WO-2022134513 A1 | * | 6/2022 | ............ B25J 9/00 |

OTHER PUBLICATIONS

Sick Sad, Drawing a Frame of a Light Animation, 2013, [retrieved Aug. 31, 2024], retrieved from the Internet <URL: https://www.youtube.com/watch?v=grOqSynXMQU&t=24s>, consisting of eight snapshots taken from video. (Year: 2013).*
Pradya Prempraneerach, Workspace and Dynamic Trajectory Tracking of Delta Parallel Robot, 2014, pp. 469-474 [online], [retrieved Aug. 20, 2024], retrieved from the Internet <URL: https://ieeexplore.ieee.org/stamp/stamp.jsp?tp=&arnumber=6978242&tag=1>. (Year: 2014).*
Chowarit Mitsantisuk et al., Force Sensorless Control with 3D Workspace Analysis for Haptic Devices based on Delta Robot, 2015, pp. 001747-001752 [online], [retrieved Aug. 17, 2014], retrieved from the Internet <URL: https://ieeexplore.ieee.org/stamp/stamp.jsp?tp=&arnumber=7392354>. (Year: 2015).*
X. Chen et al., Delta Robot Kinematics 3D Printing—Building by Learning, 2016, pp. 1-26 [online], [retrieved Aug. 17, 2024], retrieved from the Internet <URL: https://faculty.washington.edu/chx/teaching/handson3d/6-delta_kinematics.pdf>. (Year: 2016).*
Hayley McClintock et al., The milliDelta: A high-bandwidth, High-precision, Millimeter-scale Delta Robot, 3 Science Robotics eaaar3018, pp. 1-9 (2018). (Year: 2018).*
Designing for Molding: Hinges and Clips, 2019, pp. 1-5 [online], [retrieved Aug. 29, 2024], retrieved from the Internet <URL: https://www.basilius.com/blog/designing-for-molding-hinges-and-clips/#:~:text=Polypropylene%20and%20Polyethylene%20are%20good,created%20by%20molding%20a%20hinge.>. (Year: 2019).*
Prism, 2020, pp. 1-8 [online], [retrieved Aug. 30, 2024], retrieved from the Internet <URL: https://web.archive.org/web/20200810191024/https://byjus.com/maths/prism/>. (Year: 2020).*
The 10 Most Effective Methods to Reduce Manufacturing Costs, 2020, pp. 1-8 [online], [retrieved Oct. 4, 2023], retrieved from the Internet <URL: https://web.archive.org/web/20200929140703/https://bautomation.com/effective-says-to-reduce-manufacturing-costs/>. (Year: 2020).*
César M.A. Vasques et al., The 3D-Printed Low-Cost Delta Robot Óscar: Technology Overview and Benchmarking, 11 Engineering Proceedings 43-1 to 43-12 (2021). (Year: 2021).*
Merve Ace Kalafat et al., A Novel Origami-Inspired Delta Mechanism with Flat Parallelogram Joints, 13 Journal of Mechanisms and Robotics 021005-1 to 021005-11 (2021). (Year: 2021).*
Partial (Human) Translation of BR 10 2013 026771-6 A2 provided by USPTO (Year: 2024).*
Feng Gao et al., New Kinematic Structures for 2-, 3-, 4-, and 5-DOF Parallel Manipulator Designs, 37 Mechanism and Machine Theory 1395-1411 (2002). (Year: 2002).*
Zhao De-An et al., Design and Control of an Apple Harvesting Robot, 110 Biosystems Engineering 112-122 (2011). (Year: 2011).*
Robert L. Williams II, The Delta Parallel Robot: Kinematics Solutions, 2016, pp. 1-46, [retrieved Feb. 25, 2025], retrieved from the Internet <URL: https://people.ohio.edu/williams/html/PDF/DeltaKin.pdf>. (Year: 2016).*
Cong Dehong et al., Innovative Design and Realization of Lightweight Delta Robot Platform, 2017, pp. 6068-6071 [online], [retrieved Feb. 25, 2025], retrieved from the Internet <URL: https://ieeexplore.ieee.org/stamp/stamp.jsp?tp=&arnumber=7978260>. (Year: 2017).*
Eric W. Weisstein, Triangle, 2020, pp. 1-5 [online], [retrieved Feb. 24, 2025], retrieved from the Internet <URL: https://web.archive.org/web/20200625112314/https://mathworld.wolfram.com/Triangle.html>. (Year: 2020).*
Prism, 2020, pp. 1-9 [online], [retrieved Feb. 24, 2025], retrieved from the Internet <URL: https://web.archive.org/web/20201001165812/https://www.sciencefacts.net/prism.html>. (Year: 2020).*
Taro Narahara, "Architecture Meets Gaming and Robotics: Creating Interactive Prototypes and Digital Simulations for Architects", Computer-Aided Architectural Design Futures, Communications in Computer and Information Science, DOI: 10.1007/978-3-662-47386-3, Jul. 2015, 19 pages total.
Hayley McClintock et al., "The milliDelta: A high-bandwidth, high-precision, millimeter-scale Delta robot", Science Robotics, 3, DOI: 10.1126/scirobotics.aar3018, Jan. 2018, 10 pages total.
Hairong Fang et al., "Kinematics and workspace analysis of a novel 3-DOF parallel manipulator with virtual symmetric plane", Journal

(56) References Cited

OTHER PUBLICATIONS of Mechanical Engineering Science, 227, 3, DOI: 10.1177/0954406212462947, 2012, 10 pages total.

* cited by examiner

MULTI-DOF MOVING STAGE AND DISPLAY APPARATUS INCLUDING THE SAME

CROSS-REFERENCE TO RELATED APPLICATION

This application is based on and claims priority under 35 U.S.C. § 119 to Korean Patent Application No. 10-2021-0030393, filed on Mar. 8, 2021, in the Korean Intellectual Property Office, the disclosure of which is incorporated by reference herein in its entirety.

BACKGROUND

1. Field

The disclosure relates to a multi-degree of freedom (DOF) moving stage for adjusting the position of a light source, and a display apparatus including the same.

2. Description of Related Art

A vehicle head-up display system capable of effectively providing information to a driver in a vehicle has been researched and developed. The head-up display system may display and provide to a driver information such as a vehicle driving speed, fuel consumption, and engine status, or navigation information indicating the conditions of a road. The head-up display displays driving information to the driver by overlapping the information on the vehicle windshield in a front field of the driver's view.

A windshield head-up display may provide a virtual image at a position that minimizes a required change in the driver's gaze. Depending on the driver or due to the driver's movement, the position of the driver's pupils may change. In this case, an image light may not be properly transmitted to the driver's pupils.

SUMMARY

Provided is a miniaturized multi-degree of freedom (DOF) moving stage for adjusting the position of a light source providing image light.

Provided is a high-speed multi-DOF moving stage for adjusting the position of a light source providing image light.

Provided is a multi-DOF moving stage for precisely adjusting the position of a light source providing image light.

Provided is a display apparatus capable of providing a virtual image using the above-described multi-DOF moving stage.

Additional aspects will be set forth in part in the description which follows and, in part, will be apparent from the description, or may be learned by practice of example embodiments of the disclosure.

In accordance with an aspect of the disclosure, a multi-degree of freedom (DOF) moving stage includes an end-effector; three driven links pivotably connected to the end-effector at angular intervals from each other, wherein an interval between a first driven link and a second driven link of the three driven links is 90 degrees, and an interval between the first driven link and a third driven link of the three driven links is 90 degrees; three driving links pivotably connected to the three driven links, respectively; and three actuators configured to drive the three driving links, respectively.

At least one of the three driving links may have a length different from a length of each of the other two driving links.

From among the three driving links, two driving links may be arranged at a 180-degree interval from each other, wherein each of the two driving links has a first length, and wherein the other driving link of the three driving links has a second length different from the first length.

Each of the three driven links may have a same length.

At least one of the three driven links may have a length different from a length of each of the other two driven links.

Each of the three driven links may include first to fourth arms arranged at intervals; and a flexible member that connects the first to fourth arms to each other in a parallelogram shape across the intervals and that forms pivotable joints at the intervals.

The intervals between adjacent ones of the first to fourth arms may have a linear strip shape.

The intervals between adjacent ones of the first to fourth arms may have an uneven shape.

The flexible member may include an elastic member.

At least one of the first to fourth arms may have a bent hollow prism shape.

In accordance with an aspect of the disclosure, a multi-degree of freedom (DOF) moving stage includes an end-effector; a plurality of driven links, each of the plurality of driven links respectively including first to fourth arms arranged at intervals; and a flexible member that connects the first to fourth arms to each other in a parallelogram shape across the intervals, that forms pivotable joints at the intervals, and that is pivotably connected to the end-effector; a plurality of driving links pivotably connected to the plurality of driven links, respectively; and a plurality of actuators configured to drive the plurality of driving links, respectively, wherein at least one of the first to fourth arms of at least one of the plurality of driven links has a bent hollow prism shape.

For each of the plurality of driven links, the first arm may be pivotably connected to the end-effector, the third arm facing the first arm may be pivotably connected to the respective driving link, and the second arm and the fourth arm may have the bent hollow prism shape.

A length of at least one of the plurality of driving links may be different from a length of each of the other two driving links.

Each of the plurality of driven links may have a same length.

The plurality of driven links may include three driven links connected to the end-effector at 90-degree intervals from each other, and the plurality of driving links comprise three driving links respectively connected to the three driven links.

In accordance with an aspect of the disclosure, a display apparatus may include a first light source configured to provide left-eye image light; a first multi-degree of freedom (DOF) moving stage configured to adjust a position of the first light source; a second light source configured to provide right-eye image light; a second multi-DOF moving stage configured to adjust a position of the second light source; and an optical system configured to provide the left-eye image light and the right-eye image light to a left eye and a right eye of a viewer, respectively, wherein the first multi-DOF moving stage and the second multi-DOF moving stage each include an end-effector on which a light source is mounted; three driven links pivotably connected to the end-effector at angular intervals from each other, wherein an interval between a first driven link and a second driven link of the three driven links is 90 degrees, and an interval between the first driven link and a third driven link of the three driven links is 90 degrees; three driving links pivotably connected to the three driven links, respectively; and three actuators configured to drive the three driving links, respectively.

For each of the first multi-DOF moving stage and the second multi-DOF moving stage, at least one of the three driving links may have a length different from a length of each of the other two driving links.

For each of the first multi-DOF moving stage and the second multi-DOF moving stage, each of the three driven links may include first to fourth arms arranged at intervals; and a flexible member that connects the first to fourth arms to each other in a parallelogram shape across the intervals and that forms pivotable joints at the intervals.

At least one of the first to fourth arms of at least one of the three driven links of at least one of the first multi-DOF moving stage and the second multi-DOF moving stage may have a bent hollow prism shape.

For each of the first multi-DOF moving stage and the second multi-DOF moving stage, two driven links of the three driven links may be arranged in a first axis direction, and the two driven links of the first multi-DOF moving stage and the two driven links of the second multi-DOF moving stage may be arranged adjacent to each other.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
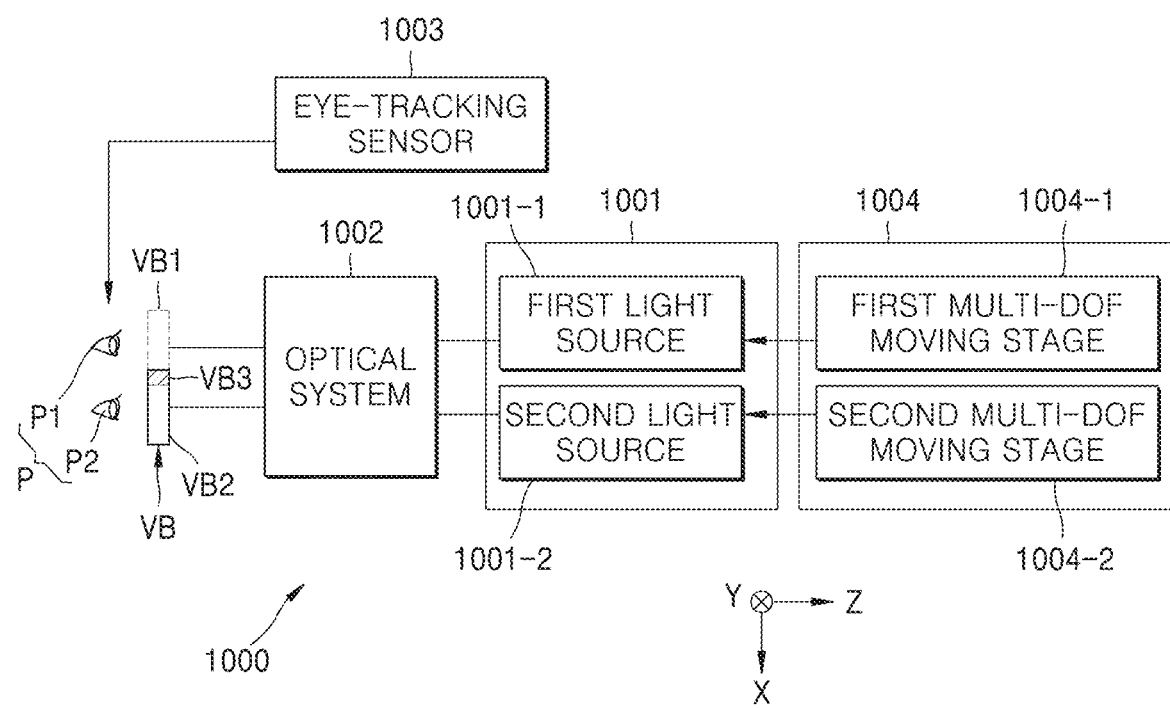
FIG. 1 is a configuration diagram of a display apparatus according to an embodiment.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a multi-degree of freedom (DOF) moving stage and a display apparatus according to an embodiment will be described in detail with reference to the accompanying drawings. In the following drawings, the same reference numerals refer to the same components, and the size or thickness of each component in the drawings may be exaggerated for clarity and convenience of description. The embodiments described below are only examples, and thus, it should be understood that the embodiments may be modified in various forms.

For example, when an element is referred to as being "on" or "above" another element, it may be directly on the other element, or intervening elements may also be present. As used herein, the singular forms "a," "an," and "the" are intended to include the plural forms as well, unless the context clearly indicates otherwise. When a portion "includes" an element, another element may be further included, rather than excluding the existence of the other element, unless otherwise described.

The use of the terms "a," "an," and "the" and similar referents is to be construed to cover both the singular and the plural. Also, the operations of all methods described herein can be performed in any suitable order unless otherwise indicated herein or otherwise clearly contradicted by context. The disclosure is not limited to the described order of the operations.

It will be understood that, although the terms first, second, etc. may be used herein to describe various elements, these elements should not be limited by these terms. These components are only used to distinguish one component from another. A high electron mobility transistor and a method of manufacturing the same may be implemented in various forms and is not limited to the embodiments.

FIG. 1 is a schematic configuration diagram of a display apparatus 1000 according to an embodiment. Referring to FIG. 1, the display apparatus 1000 may include a light source 1001 that provides image light and an optical system 1002 that provides the image light to a driver's pupils P. The light source 1001 may include a first light source 1001-1 and a second light source 1001-2. The first light source 1001-1 provides, for example, left-eye image light. The second light source 1001-2 provides, for example, right-eye image light. The first light source 1001-1 and the second light source 1001-2 may each be an image generator that provides image light, for example, a small projector. The first light source 1001-1 and the second light source 1001-2 may be light sources that provide light that has not yet been modulated into image light. The optical system 1002 may include a first optical system and a second optical system that provide the left-eye image light and the right-eye image light to a left pupil P1 and a right pupil P2 of an observer, respectively.

The display apparatus 1000 may be, for example, a vehicle head-up display, a holographic 3D display, a 2D stereo display, or the like. For example, in the vehicle head-up display, a technology for providing various information of the vehicle to the field of view of a windshield of the vehicle so that the driver can see it is applied. Through this, the driver may obtain various information necessary for driving while maintaining a forward gaze while driving. Conventionally, because flat graphics formed on a display panel are projected onto a windshield, the driver may only obtain simple screen information without a three-dimensional effect, far from the sense of unity with the actual road ahead. Various studies have been conducted to apply holographic technologies capable of giving three-dimensional visual information to a driver to a vehicle head-up display as a method capable of delivering various and intuitive information that has a sense of unity with an actual road. A holography technology is a technology that provides three-dimensional visual information by accurately matching two different light sources to the driver's pupils P to make the visual information entering left and right pupils P1 and P2 different. However, the positions of the pupils P are not always the same according to the driver's movement, and the positions of the pupils P may change rapidly depending on circumstances. At this time, when a light source cannot follow the driver's pupils P and does not accurately correspond to the positions of the pupils P, the driver may receive information with distorted three-dimensional effect or may not be able to receive the information. Therefore, to implement holography technology, it is needed to quickly and accurately adjust the position of a light source to correspond to the position of the pupils P within a range (a view box VB) where the driver's pupils P are expected to be located.

To this end, the display apparatus 1000 may include an eye-tracking sensor 1003 and a multi-DOF moving stage 1004 that adjusts the position of the light source 1001. The eye-tracking sensor 1003 may track the movement of the pupils P and transmit position information of the pupils P to a controller, and the controller may adjust the position of the light source 1001 so that image light is transmitted to the pupils P by driving the multi-DOF moving stage 1004 according to the position information of the pupils P. The multi-DOF moving stage 1004 may include a first multi-DOF moving stage 1004-1 and a second multi-DOF moving stage 1004-2 corresponding to the first light source 1001-1 and the second light source 1001-2, respectively.

However, in addition to speed and precision requirements of the holography technology, in order to be applied as a vehicle head-up display, the display apparatus 1000 needs to be miniaturized. Because the vehicle head-up display reflects an image on a windshield of the vehicle and projects the image to the driver's pupils P, the light source 1001 and the multi-DOF moving stage 1004 are arranged in a limited space at the bottom of the windshield. In order to implement a compact system configuration, the two independent multi-DOF moving stages 1004-1 and 1004-2 need to be clustered and arranged in parallel, and the multi-DOF moving stage 1004 needs to be miniaturized.

Figure 2:
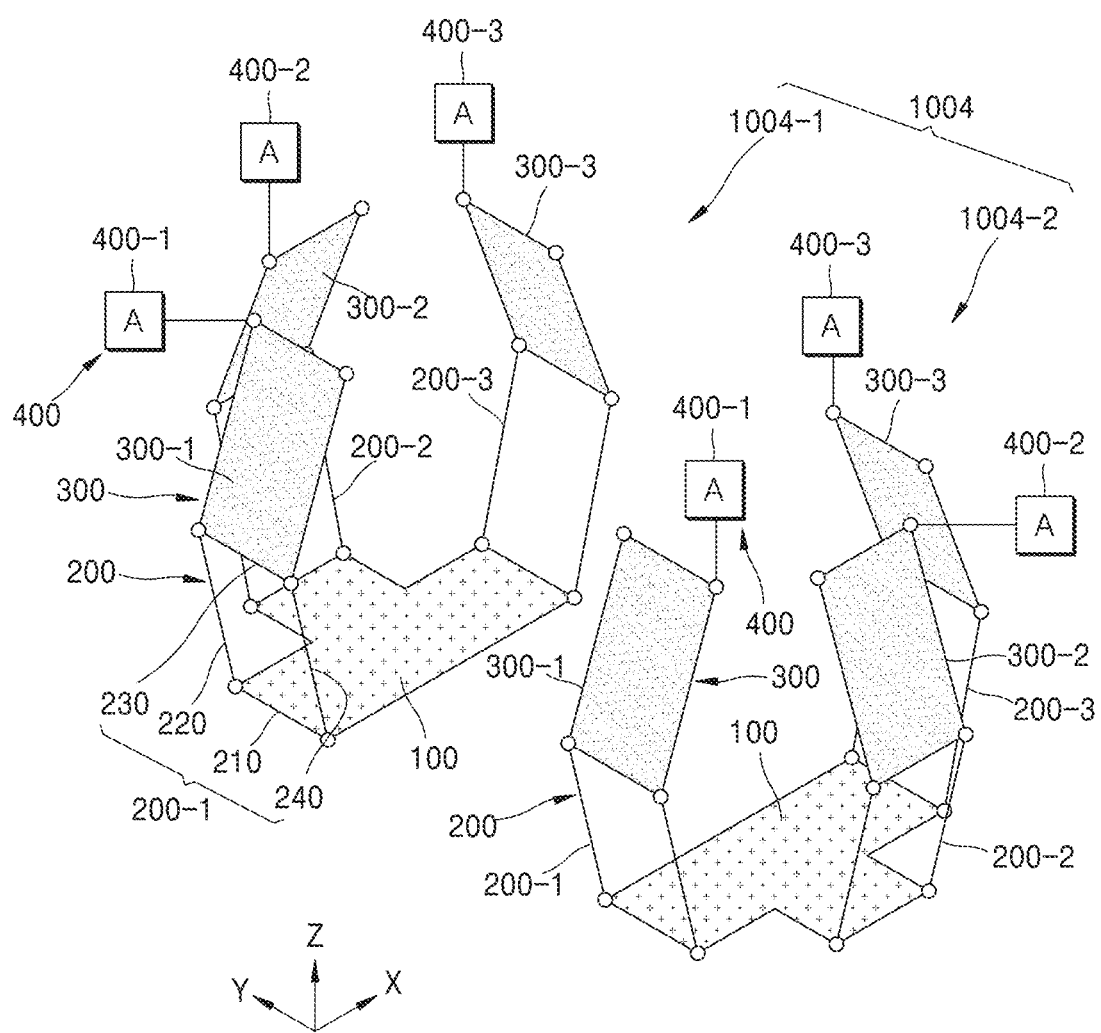
FIG. 2 is a configuration diagram of an embodiment of a delta robot type multi-degree of freedom (DOF) moving stage.

Known multi-DOF moving stage methods include a variety of mechanisms such as a delta robot, a hexapod type parallel mechanism, a cable driven mechanism, and a robot arm mechanism. In the delta robot, because a moving portion on which a light source is mounted is separated from an actuator, the moment of inertia of the moving portion may be minimized, so that the moving portion may move quickly and accurately and repeatedly. FIG. 2 is a schematic configuration diagram of an embodiment of a delta robot type multi-DOF moving stage 1004. Referring to FIG. 2, the multi-DOF moving stage 1004 may include the first multi-DOF moving stage 1004-1 and the second multi-DOF moving stage 1004-2 arranged symmetrically to each other. The first and second multi-DOF moving stages 1004-1 and 1004-2 are arranged symmetrically with respect to a first axis, for example, an X-axis. Because the first and second multi-DOF moving stages 1004-1 and 1004-2 have the same configuration, the following description will be made based on the first multi-DOF moving stage 1004-1. As shown in FIG. 2, the first multi-DOF moving stage 1004-1 may include an end-effector 100 on which a light source, for example, the first light source 1001-1 is mounted, a plurality of driven links 200 pivotably connected to the end-effector 100, a plurality of driving links 300 respectively pivotably connected to the plurality of driven links 200, and a plurality of actuators 400 for driving the plurality of driving links 300.

As an embodiment, the plurality of driven links 200 may include three driven links 200-1, 200-2, and 200-3. The plurality of driving links 300 may include three driving links 300-1, 300-2, and 300-3 respectively pivotably connected to the three driven links 200-1, 200-2, and 200-3. The plurality of actuators 400 may include three actuators 400-1, 400-2, and 400-3 that respectively drive the three driving links 300-1, 300-2, and 300-3.

For example, the three driven links 200-1, 200-2, and 200-3 are connected to the end-effector 100 such that the driven links 200-1 and 200-3 are connected at 90-degree intervals from the driven link 200-2. The driven links 200-1 and 200-3 are located to face each other in a first axis direction and may be connected to the end-effector 100 to be pivotable about a pivot axis parallel to a second axis perpendicular to the first axis. The driven link 200-2 may be connected to the end-effector 100 to be pivotable about a pivot axis parallel to the first axis at an angle of 90 degrees with respect to the driven links 200-1 and 200-3. The driving links 300-1 and 300-3 may be connected to the driven links 200-1 and 200-3 to be pivotable about a pivot axis parallel to the second axis. The driving link 300-2 may be connected to the driven link 200-2 to be pivotable about the pivot axis parallel to the first axis at an angle of 90 degrees with respect to the driven links 300-1 and 300-3.

For example, the three driven links 200-1, 200-2, and 200-3 may be pivotably connected to a −X side end, a +Y side end, and a +X side end of the end-effector 100, respectively. The driven links 200-1 and 200-3 are located to face each other in an X-axis direction and may be connected to the end-effector 100 to be pivotable about a pivot axis parallel to a Y-axis. The driven link 200-2 may be connected to the end-effector 100 to be pivotable about a pivot axis parallel to the X-axis at an angle of 90 degrees with respect to the driven links 200-1 and 200-3. The driving links 300-1 and 300-3 may be connected to the driven links 200-1 and 200-3 to be pivotable about a pivot axis parallel to the Y-axis. The driving link 300-2 may be connected to the driven link 200-2 to be pivotable about the pivot axis parallel to the X-axis at an angle of 90 degrees with respect to the driven links 300-1 and 300-3.

Each of the three driven links 200-1, 200-2, and 200-3 may include first to fourth arms 210, 220, 230, and 240 connected to each other in a parallelogram shape. The first to fourth arms 210, 220, 230, and 240 of each of the driven links 200-1, 200-3 are connected to each other to be pivotable about a first axis, for example, a pivot axis parallel to the X-axis. The first to fourth arms 210, 220, 230, and 240 of each of the driven link 200-2 are connected to each other to be pivotable about a second axis, for example, the pivot axis parallel to the Y-axis. Accordingly, the first to fourth arms 210, 220, 230, and 240 of each of the three driven links 200-1, 200-2, and 200-3 form a parallelogram and may be connected to each other to be pivotable.

The first arm 210 of each of the three driven links 200-1, 200-2 and 200-3 is pivotably connected to the end-effector 100. The third arm 230 facing the first arm 210 of each of the three driven links 200-1, 200-2, 200-3 is pivotably connected to the three driving links 300-1, 300-2, and 300-3. For example, the first arm 210 of each of the driven links 200-1 and 200-3 is parallel to the second axis, for example, the Y-axis. The third arm 230 of each of the driven links 200-1 and 200-3 is parallel to the first arm 210. The third arm 230 of each of the driven links 200-1 and 200-3 is respectively connected to the driving links 300-1 and 300-3 to be pivotable about the second axis, for example, the pivot axis parallel to the Y-axis. The second and fourth arms 220 and 240 of each of the driven links 200-1 and 200-3 are parallel to each other, and are connected to the first and third arms 210 and 230 to be pivotable about the first axis, for example, the pivot axis parallel to the X-axis. The first arm 210 of the driven link 200-2 is parallel to the first axis, for example, the X-axis. The third arm 230 of the driven link 200-2 is parallel to the first arm 210. The third arm 230 of the driven link 200-2 is connected to the driving link 300-2 to be pivotable about the first axis, for example, the pivot axis parallel to the X-axis. The second and fourth arms 220 and 240 of the driven link 200-2 are parallel to each other, and are connected to the first and third arms 210 and 230 to be pivotable about the second axis, for example, the pivot axis parallel to the Y-axis.

The three actuators 400-1, 400-2, and 400-3 pivot the three driving links 300-1, 300-2, and 300-3, respectively. For example, the actuators 400-1 and 400-3 pivot the driving links 300-1 and 300-3 about the second axis, that is, the pivot axis parallel to the Y-axis, respectively. Then, the driven links 200-1 and 200-3 pivot about the pivot axis parallel to the Y-axis. The first to fourth arms 210, 220, 230, and 240 of the driven links 200-1 and 200-3 pivot about the first axis, that is, the pivot axis parallel to the X-axis while maintaining a parallelogram shape. The actuator 400-2 pivots the driving link 300-2 about the first axis, for example, the pivot axis parallel to the X-axis. Then, the driven link 200-2 pivots about the pivot axis parallel to the X-axis. The first to fourth arms 210, 220, 230, and 240 of the driven link 200-2 pivot about the second axis, that is, the pivot axis parallel to the Y-axis while maintaining a parallelogram shape. With this configuration, by adjusting driving amounts of the three actuators 400-1, 400-2, and 400-3, the end-effector 100 may be translated in X, Y, and Z directions. In addition, the end-effector 100 may be pivoted about X, Y, and Z-axes. For example, the first multi-DOF moving stage 1004-1 may be driven to translate the first light source 1001-1 in the X, Y, and Z directions to provide left-eye image light to the left pupil P1. The second multi-DOF moving stage 1004-2 may be driven to translate the second light source 1001-2 in the X, Y, and Z directions to provide right eye image light to the right pupil P2.

A range in which the pupils P is expected to be located in the display apparatus 1000, for example, the view box VB, is the union of a range VB1 in which the left pupil P1 may be located and a range VB2 in which the right pupil P2 may be located. A range VB3 in which the range VB1 of the left pupil P1 and the range VB2 of the right pupil P2 are located at the same time may exist. Accordingly, an area where a movement range of the first light source 1001-1 and a movement range of the second light source 1001-2 overlap may exist. In a typical delta robot, three driven links are arranged at 120 degrees to each other. In this case, links of a delta robot for the left eye and links of a delta robot for the right eye may interfere with each other in the range VB3.

Because the first light source 1001-1 and the second light source 1001-2 need to be sufficiently separated from each other to reduce the possibility of interference, it is difficult to make an optical configuration of the display apparatus 1000 compact.

In the first and second multi-DOF moving stages 1004-1 and 1004-2 of the present embodiment, the three driven links 200-1, 200-2, and 200-3 are arranged with the end-effector 100 at 90-degree intervals from each other. The first multi-DOF moving stage 1004-1 includes the two driven links 200-1 and 200-3 arranged in the first axis, that is, the X-axis direction, and the second multi-DOF moving stage 1004-2 also includes the two driven links 200-1 and 200-3 arranged in the first axis, that is, the X-axis direction. The first multi-DOF moving stage 1004-1 and the second multi-DOF moving stage 1004-2 are arranged symmetrically with respect to the first axis, that is, the X-axis. In other words, the driven links 200-1 and 200-3 of the first multi-DOF moving stage 1004-1 and the driven links 200-1 and 200-3 of the second multi-DOF moving stage 1004-2 are arranged adjacent to each other. The driven link 200-2 of the first multi-DOF moving stage 1004-1 and the driven link 200-2 of the second multi-DOF moving stage 1004-2 are arranged to be apart from each other in the second axis direction, that is, the Y-axis direction. When the first light source 1001-1 and the second light source 1001-2 are moved in the second axis, that is, the Y-axis direction, they are driven in the same direction. That is, the first light source 1001-1 and the second light source 1001-2 are moved together in a +Y direction or a −Y direction. Therefore, the possibility of interference between the first multi-DOF moving stage 1004-1 and the second multi-DOF moving stage 1004-2 in the range VB3 may be reduced. In addition, because the first light source 1001-1 and the second light source 1001-2 may be arranged close together, an optical configuration of the display apparatus 1000 may be made compact.

Figure 3:
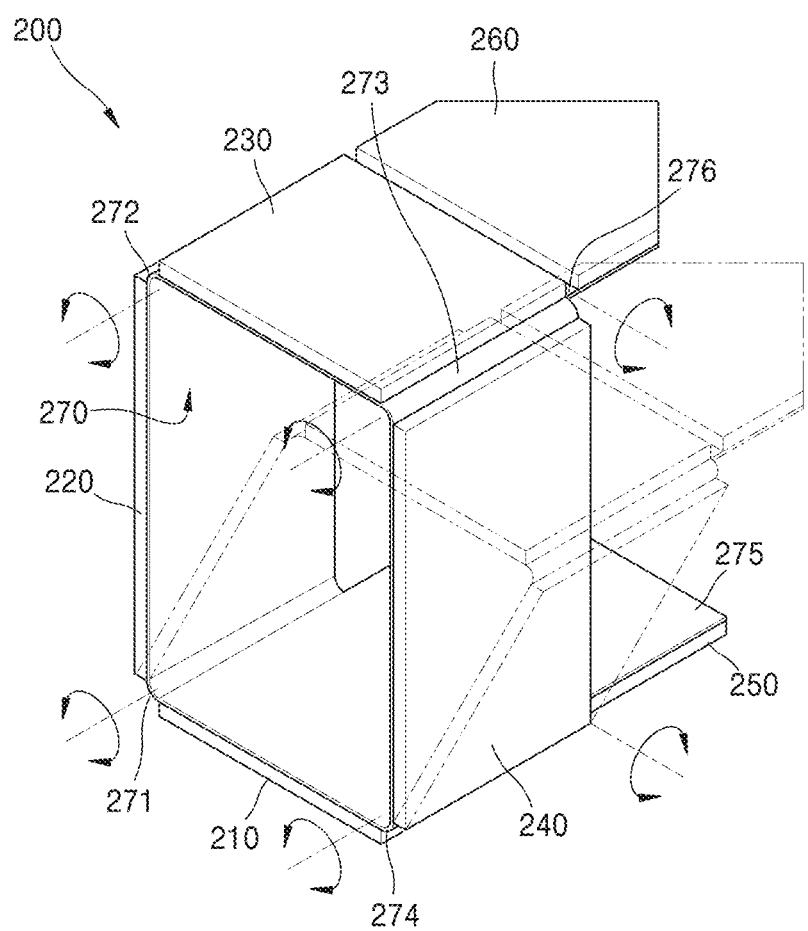
FIG. 3 is a perspective view showing an embodiment of a driven link.

A driven link 200 has a structure in which the first to fourth arms 210, 220, 230, and 240 are connected to each other to be pivotable while forming a parallelogram. To this end, pivotable joints are provided at connecting portions of the first to fourth arms 210, 220, 230, and 240. FIG. 3 is a perspective view showing an embodiment of the driven link 200. FIG. 3 shows an embodiment of the driven link 200-1, and the embodiment of the driven link 200-1 shown in FIG. 3 may be applied equally to the driven links 200-1 and 200-3.

Referring to FIG. 3, the driven link 200 includes the first to fourth arms 210, 220, 230, and 240 each in the form of a thin plate. The first to fourth arms 210, 220, 230, and 240 form a parallelogram by joints 271, 272, 273, and 274 and are pivotably connected to each other. A first connecting portion 250 may be pivotably connected to the first arm 210 by, for example, a first joint 275. The end-effector 100 is connected to the first connecting portion 250. A second connecting portion 260 may be pivotably connected to the third arm 230 by, for example, a second joint 276. A driving link 300 is connected to the second connecting portion 260.

A conventional 3-axis delta robot is formed by assembling many parts such as shafts, bearings, and pulleys. It is difficult to implement a miniaturized and inexpensive 3-axis delta robot because the miniaturization of complex parts such as shafts, bearings, and pulleys and elaborate and complex assembly work of these parts are required to miniaturize this type of 3-axis delta robot. In an example embodiment, the driven link 200 is formed based on an origami method.

Figure 4:
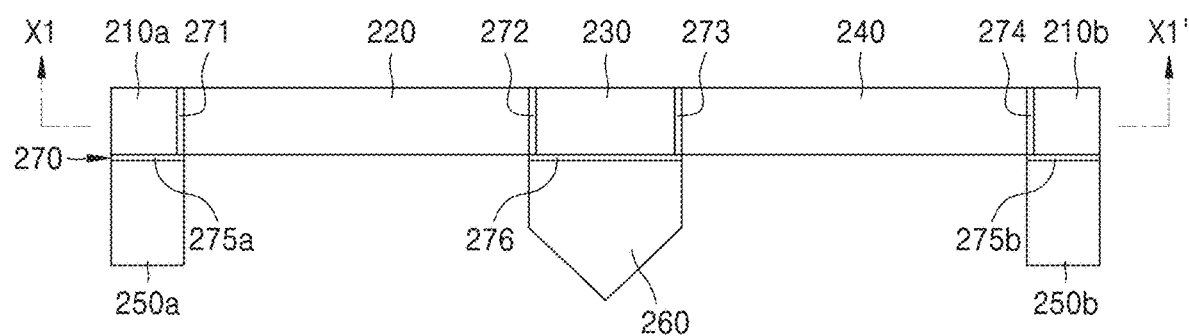
FIG. 4 is a development view of an embodiment of the driven link shown in FIG. 3.
Figure 5:
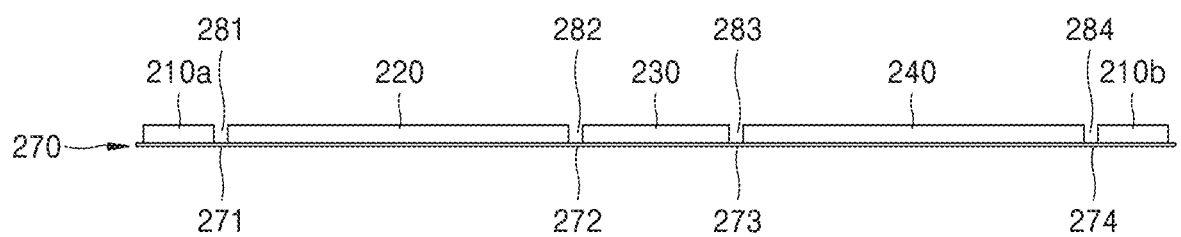
FIG. 5 is a cross-sectional view of the driven link, taken along line X1-X1' of FIG. 4.

FIG. 4 is a development view of an embodiment of the driven link 200 shown in FIG. 3, and FIG. 5 is a cross-sectional development view of the driven link 200, taken along line X1-X1' of FIG. 4. Referring to FIGS. 4 and 5, the driven link 200 may include the first to fourth arms 210, 220, 230, and 240 that are sequentially arranged at intervals 281, 282, 283, and 284, and a flexible member 270 forming the joints 271, 272, 273, and 274 that connect the first to fourth arms 210, 220, 230, and 240 to each other in a parallelogram shape across the intervals 281, 282, 283, and 284 and are pivotable at the intervals 281, 282, 283, and 284. The first arm 210 may be formed by connecting a segment arm 210a to a segment arm 210b. For example, a portion of the segment arm 210a may overlap the segment arm 210b and may be attached to the segment arm 210b. A rigid connection member may connect segment arm 210a and the segment arm 210b to form the first arm 210. The flexible member 270 may be formed of a material having softness, such as a film or a fabric. The flexible member 270 may include an elastic member. For example, the flexible member 270 may be in a form in which a flexible material such as a fabric and an elastic member such as a polymer material are stacked or combined. The first to fourth arms 210, 220, 230, and 240 may be formed of a rigid thin plate such as a polymer film or compressed paper. For example, the first to fourth arms 210, 220, 230, and 240 may be attached to the flexible member 270 with intervals 281, 282, 283, and 284, respectively between adjacent ones of the first to fourth arms 210, 220, 230, and 240. By bending the flexible member 270 at the intervals 281, 282, 283, and 284 and connecting the segment arm 210a to the segment arm 210b, the driven link 200 in a parallelogram shape as shown in FIG. 3 may be implemented. The flexible member 270 may form the joints 271, 272, 273, and 274 pivotably connecting the first to fourth arms 210, 220, 230, and 240 to each other at the intervals 281, 282, 283, and 284. Segment connecting portions 250a and 250b may be arranged on the flexible member 270 at a distance from the segment arms 210a and 210b, and the second connecting portion 260 may be arranged at a distance from the third arm 230. The segment connecting portions 250a and 250b form the first connecting portion 250. For example, a portion of the segment connecting portion 250a may overlap the segment connecting portion 250b and may be attached to the segment connecting portion 250b. A rigid connection member may connect segment connecting portion 250a and the segment connecting portion 250b to form the first connecting portion 250. Also, the segment connecting portions 250a and 250b may be connected to the end effector 100, respectively. The flexible member 270 forms segment joints 275a and 275b at the intervals between the segment arms 210a and 210b and the segment connecting portions 250a and 250b, and the first joint 275 is formed by the segment joints 275a and 275b. The flexible member 270 forms a second joint 276 at an interval between the third arm 230 and the second connecting portion 260.

According to an example embodiment, because the joints 271, 272, 273, and 274, and the first and second joints 275 and 276 may be formed using a light material, the moment of inertia of the driven link 200 may be reduced, so that a multi-DOF moving stage 1004 capable of high-speed and precise driving may be implemented. In addition, because a pivotable driven link 200 in the form of a parallelogram may be implemented by an origami method, the multi-DOF moving stage 1004 may be implemented with a simple structure and low cost.

In FIG. 5, the first to fourth arms 210, 220, 230, and 240 are arranged on one side or both sides of the flexible member 270. In addition, multiple first to fourth arms 210, 220, 230, and 240 in a multilayer shape may be arranged on at least one of the one side or both sides of the flexible member 270. The first and second connecting portions 250 and 260 may be arranged on one side or both sides of the flexible member 270, and multiple first and second connecting portions 250 and 260 in a multilayer shape may be arranged on at least one of the one side and both sides of the flexible member 270.

Figure 6:
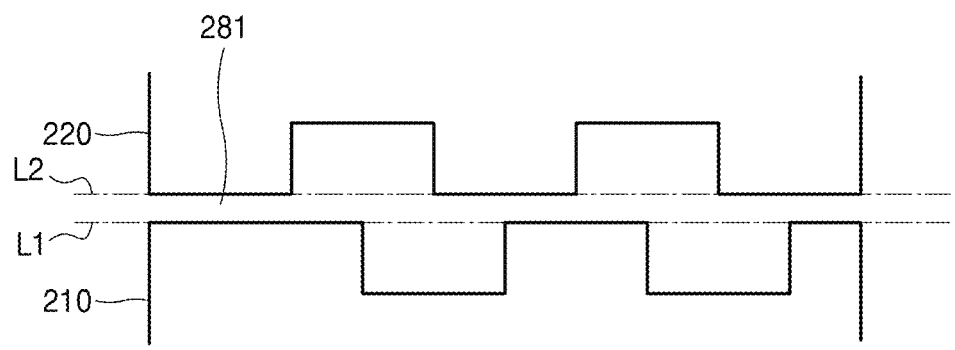
FIGS. 6 to 8 are views of examples of various shapes of intervals forming joints shown in FIG. 5.
Figure 7:
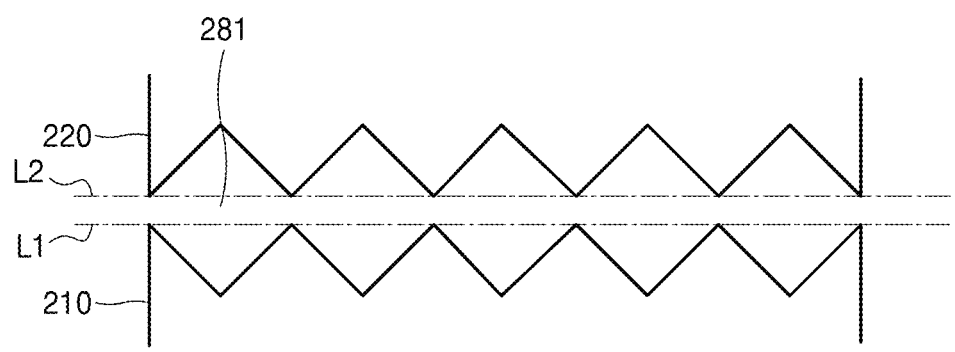
Figure 8:
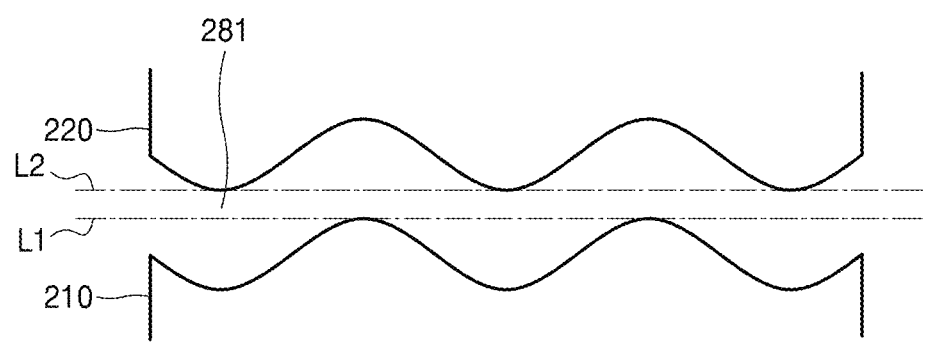

The intervals 281, 282, 283, and 284 may have a linear strip shape as shown in FIG. 4. In addition, the shape of the intervals 281, 282, 283, and 284 may vary. FIGS. 6 to 8 show examples of various shapes of the intervals 281, 282, 283, and 284. FIGS. 6 to 8 show an interval 281 between the first arm 210 and the third arm 230 as an example, but the structures of FIGS. 6 to 8 may be equally applied to the intervals 282, 283, and 284. In addition, the structures of FIGS. 6 to 8 may be applied to an interval between the first arm 210 and the first connecting portion 250 and an interval between the third arm 230 and the second connecting portion 260. Referring to FIGS. 6 to 8, the interval 281 may have an uneven shape such as a step shape (e.g., FIG. 6), a sawtooth shape (e.g., FIG. 7), and a wave shape (e.g., FIG. 8). Peaks of the uneven-shaped interval may be aligned on straight lines L1 and L2. The straight lines L1 and L2 may be the same or different lines.

The flexibility or elasticity of the joints 271, 272, 273, and 274 and the first and second joints 275 and 276 may be determined by the material of the flexible member 270 and the shapes of the intervals. According to example embodiments shown in FIGS. 6 to 8, by changing the shape of the interval without changing the material of the flexible member 270, the flexibility or elasticity of the joints 271, 272, 273, and 274 and the first and second joints 275 and 276 may be adjusted. In addition, by changing the shape of the interval, stable and precise multi-DOF moving is possible by minimizing the offset in the connecting portion of the end effector 100, the driven link 200, and the driving link 300 and in the joints of the driven link 200.

Figure 9:
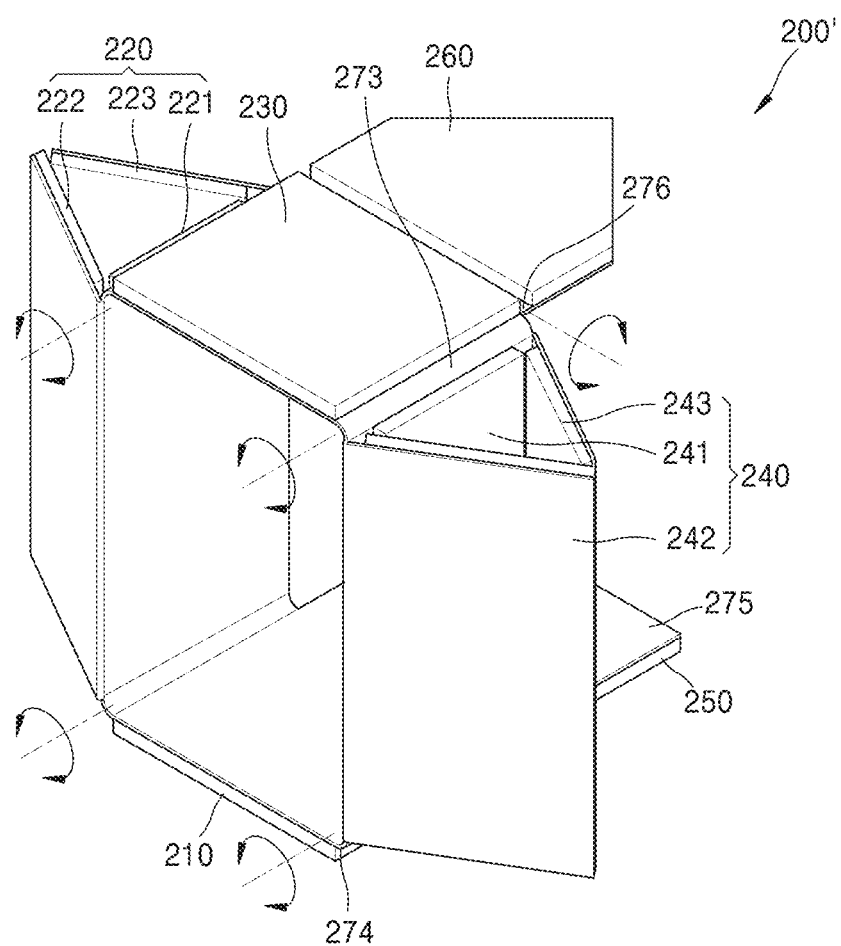
FIG. 9 is a perspective view of an embodiment of a driven link.
Figure 10:
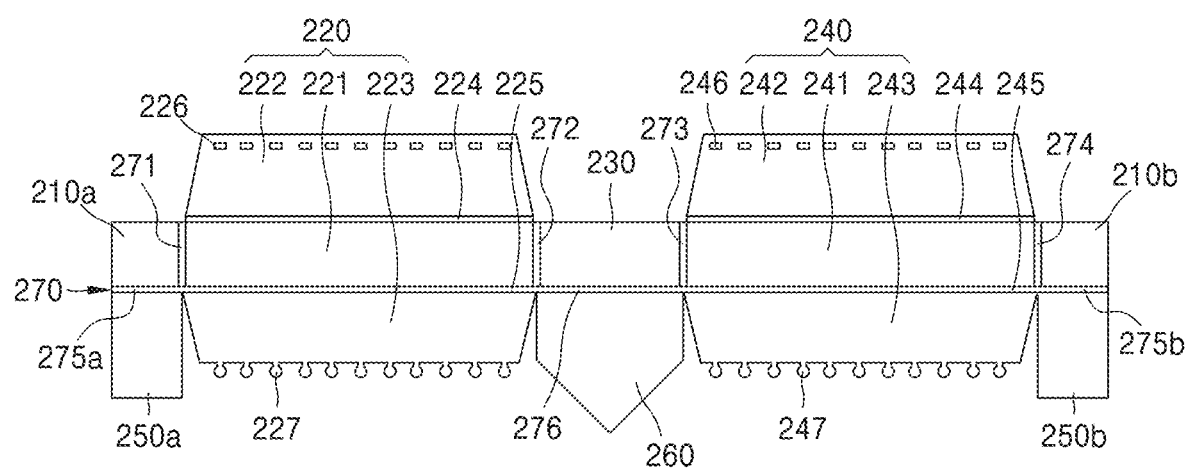
FIG. 10 is a development view of an embodiment of the driven link shown in FIG. 9.

In order to strengthen the rigidity of the first to fourth arms 210, 220, 230, and 240, at least one of the first to fourth arms 210, 220, 230, and 240 may have a bent hollow prism shape. FIG. 9 is a perspective view of an embodiment of the driven link 200, and FIG. 10 is a development view of an embodiment of the driven link 200 shown in FIG. 9. The driven link 200 of this example embodiment is different from the example embodiment of the driven link 200 shown in FIG. 3 in that the second and fourth arms 220 and 240 are bent hollow prisms. Referring to FIGS. 9 and 10, the second and fourth arms 220 and 240 have a bent hollow triangular column shape. The second arm 220 includes first to third plate-like members 221, 222, and 223. The first to third plate-like members 221, 222, and 223 are arranged on the flexible member 270 to be apart from each other at intervals. The flexible member 270 forms a bending portion 224 that connects the first and second plate-like members 221 and 222 to be bent and a bending portion 225 that connects the first and third plate-like members 221 and 223 to be bent. One of the second and third plate-like members 222 and 223 is provided with grooves 226 and the other one of the second and third plate-like members 222 and 223 is provided with protrusions 227 that may be male and female to be coupled to each other, respectively. When the second and third plate-like members 222 and 223 are folded with respect to the first plate-like member 221 along the bending portions 224 and 225 and a protrusion 227 is inserted into a groove 226, the second arm 220 in a hollow triangular column shape may be implemented.

Similarly, the fourth arm 240 includes first to third plate-like members 241, 242, and 243. The first to third plate-like members 241, 242, and 243 are arranged on the flexible member 270 to be apart from each other at intervals. The flexible member 270 forms a bending portion 244 that connects the first and second plate-like members 241 and 242 to be bent and a bending portion 245 that connects the first and third plate-like members 241 and 243 to be bent. One of the second and third plate-like members 242 and 243 provided with grooves 246 and the other one of the second and third plate-like members 242 and 243 is provided with protrusions 247 that may be male and female to be coupled to each other, respectively. When the second and third plate-like members 242 and 243 are folded with respect to the first plate-like member 241 along the bending portions 244 and 245 and a protrusion 247 is inserted into a groove 246, the second arm 240 in a hollow triangular column shape may be implemented.

With such a configuration, the rigidity of the driven link 200 may be reinforced by a simple and inexpensive structure. In addition, it is possible to increase the rigidity of the driven link 200 while minimizing an increase in the moment of inertia of the driven link 200. FIGS. 9 and 10 show the driven link 200 having an arm in a hollow triangular column shape, but if necessary, at least one arm of the driven link 200 may have a shape such as a square column or a pentagonal column.

When a three-axis delta robot is driven and two robot axes are aligned on the same line, unpredictable behavior may result. For example, when two of three pivotable connecting portions of the three driving links 300-1, 300-2, and 300-3 and the three driven links 200-1, 200-2, and 200-3 are aligned on the same line, the driving direction and speed of the end effector 100 may become unpredictable. This is called a singularity effect. In order to eliminate the unstable behavior of the end effector 100 due to the singularity effect, it is necessary to reduce the possibility that the two connecting portions are aligned on the same line. To this end, a length of at least one of the three driving links 300-1, 300-2, and 300-3 may be different from a length of the other two driving links of the three driving links 300-1, 300-2, and 300-3. In this case, lengths of the three driven links 200-1, 200-2, and 200-3 may be the same or may be different from each other. As an example, the two driving links 300-1 and 300-3 facing 180 degrees apart, in the X-axis direction may have the same length (a first length), and a length (second length) of the driving link 300-2 formed at an interval of 90 degrees from the two driving links 300-1 and 300-3 may be different from the first length. In this case, the driven links 200-1, 200-2, and 200-3 may have the same length. As another example, the lengths of the three driving links 300-1, 300-2, and 300-3 may be the same, and the length of at least one of the three driven links 200-1, 200-2, and 200-3 may be different from the length of the other two driven links. The length of the driven link 200 refers to the length of the second arm 220 or the fourth arm 240. With such a configuration, unpredictability in the behavior of the end effector 100 due to the singularity effect may be eliminated.

Figure 11:
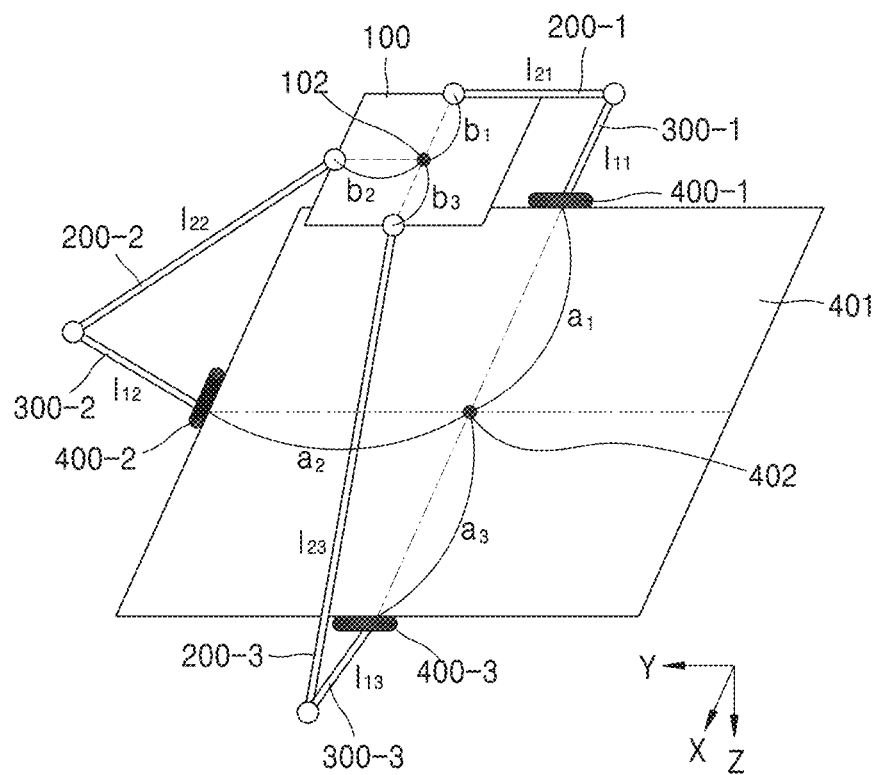
FIG. 11 is a schematic diagram of an embodiment of a multi-DOF moving stage.
Figure 12:
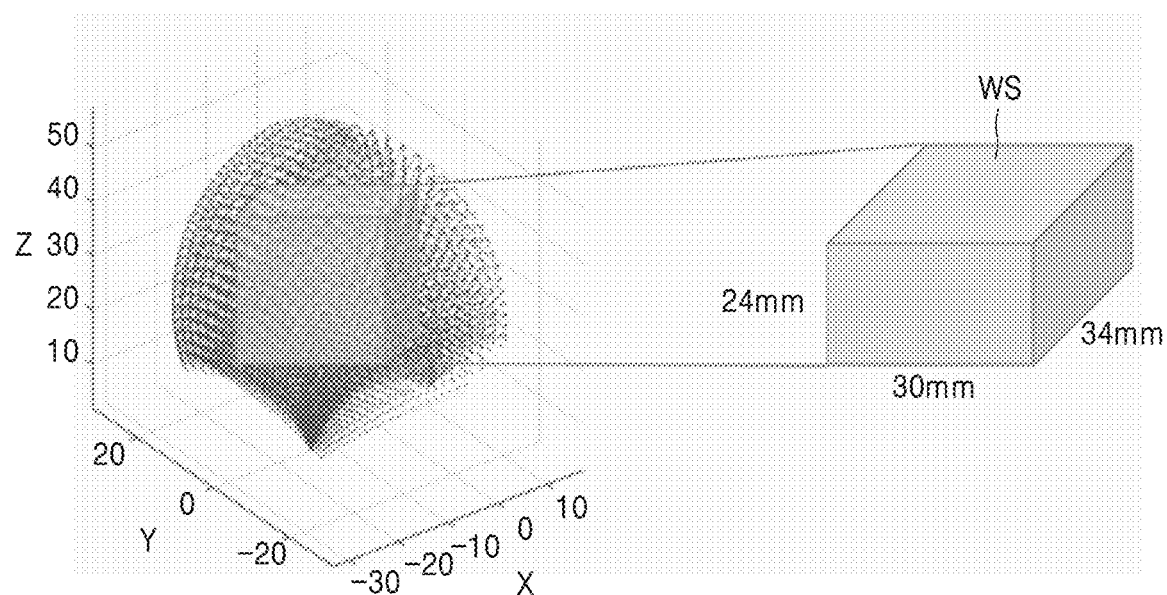
FIG. 12 is a graph showing an example of a workspace according to an embodiment of the multi-DOF moving stage shown in FIG. 11.
Figure 13:
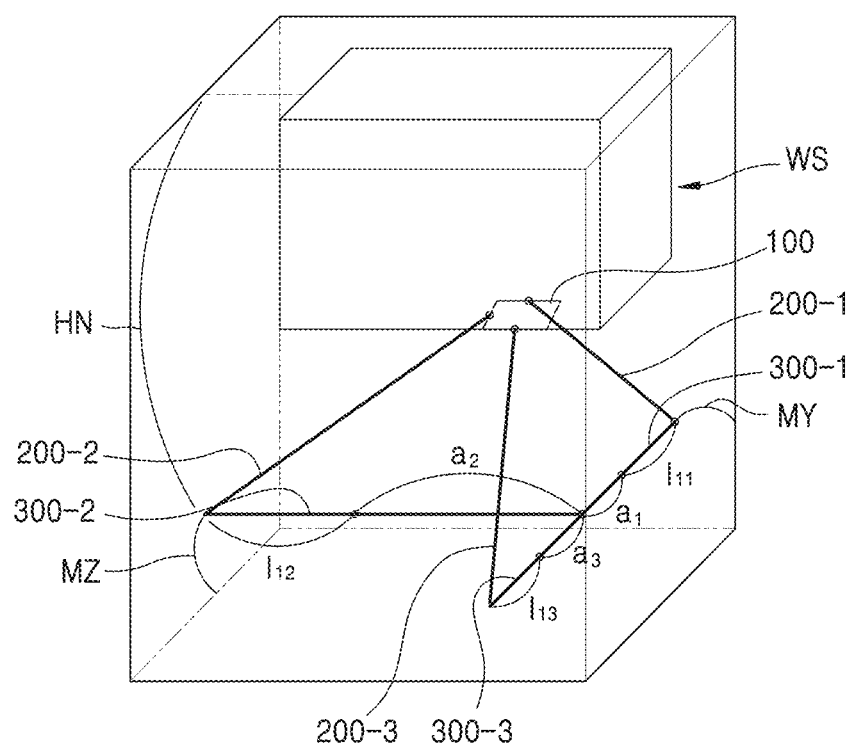
FIG. 13 is a view of an example of a space occupied by a multi-DOF moving stage to implement the workspace of FIG. 12.

FIG. 11 is a schematic diagram of an embodiment of the multi-DOF moving stage 1004, FIG. 12 is a graph showing an example of a workspace according to an embodiment of the multi-DOF moving stage 1004 shown in FIG. 11, and FIG. 13 is a view of an example of a space occupied by the multi-DOF moving stage 1004 to implement the workspace of FIG. 12. Referring to FIG. 11, $a_1$, $a_2$, and $a_3$ are distances from a center 402 of a base 401 on which the actuators 400-1, 400-2, and 400-3 are installed to the actuators 400-1, 400-2, and 400-3, and are 20 mm, 50 mm, and 20 mm, respectively. $b_1$, $b_2$, and $b_3$ are distances from a center 102 of the end-effector 100 to the driven links 200-1, 200-2, and 200-3, and are 15 mm, 30 mm, and 15 mm, respectively. $l_{11}$, $l_{12}$, and $l_{13}$ are lengths of the driving links 300-1, 300-2, and 300-3, respectively. The lengths $l_{11}$ and $l_{13}$ of the driving links 300-1 and 300-3 arranged at a 180-degree interval from each other are the same and are 25 mm. The length $l_{12}$ of the drive link 300-2 arranged at an interval of 90 degrees with the driving links 300-1 and 300-3 is 26 mm, which is longer than the lengths $l_{11}$ and $l_{13}$ of the drive links 300-1 and 300-3. $l_{21}$, $l_{22}$, and $l_{23}$ are lengths of the driven links 200-1, 200-2, and 200-3, respectively. In this example embodiment, $l_{21}$, $l_{22}$, and $l_{23}$ are the same, and $l_{21}=l_{22}=l_{23}=33$ mm. With this configuration, as shown in FIG. 12, a workspace WS of 34 mm×30 mm×24 mm may be implemented in XYZ directions.

In FIG. 13, $H_N$ is a distance from the base 401 to the end effector 100 when the end effector 100 has a maximum displacement in the Z direction. In this example embodiment, $H_N$ is about 44 mm. $M_z$ is a margin in the Z direction, and is a value taking into account the portion of the actuators 400-1, 400-2, and 400-3 protruding from the base 401 in the Z direction. In this example embodiment, $M_z$ is about 25 mm. $M_z$ may also be reduced by employing compact actuators 400-1, 400-2, and 400-3. $M_Y$ is a margin in the Y direction, and is a value taking into account the portion of the actuators 400-1, 400-2, and 400-3, the driving links 300-1, 300-2, and 300-3, and the driven links 200-1, 200-2, and 200-3 protruding from the base 401 in the Y direction. In this example, for example, $M_Y$ is about 14 mm.

A maximum value of a space occupied by the multi-DOF moving stage 1004 in the Z direction is $H_N$ $M_z$=44+25=69 mm. A maximum value of a space occupied by the multi-DOF moving stage 1004 in the X direction is $a_1+a_3+l_{11}+l_{13}$=20+20+25+25=90 mm. A maximum value of a space occupied by the multi-DOF moving stage 1004 in the Y direction is $a_2+l_{12}+M_Y$=50+26+14=90 mm. Therefore, a maximum volume occupied by the multi-DOF moving stage 1004 having the workspace WS is 69×90×90=558,900 mm³≅0.56 litter (L). Accordingly, a compact multi-DOF moving stage 1004 occupying a very small space may be implemented.

In the above-described example embodiments, the three driven links 200-1, 200-2 and 200-3 are arranged such that the driven links 200-1 and 200-3 are connected at 90-degree intervals from the driven link 200-2, but are not limited thereto. For example, the three driven links 200-1, 200-2 and 200-3 may be arranged at 120-degree intervals. In this case, as shown in FIGS. 3 to 10, each of the three driven links 200-1, 200-2, 200-3 may include the flexible member 270 forming the first to fourth arms 210, 220, 230, and 240 that are plate-shaped and sequentially arranged at intervals, and the joints 271, 272, 273, and 274 that connect the first to fourth arms 210, 220, 230, and 240 to each other in a parallelogram shape across the intervals and are pivotable at the intervals. In this way, by employing the driven link 200 that may be implemented in an origami method, the moment of inertia of a moving portion may be reduced, so that a small and low-cost multi-DOF moving stage 1004 capable of high-speed and precise driving may be implemented. In addition, by forming at least one of the first to fourth arms 210, 220, 230, and 240 into a bent hollow prism shape, it is possible to increase the rigidity of the driven link 200 while minimizing an increase in the moment of inertia of the moving part. In addition, in order to eliminate behavior instability caused by the singularity effect, the lengths of the three driving links 300-1, 300-2, and 300-3 may be different. In this case, the lengths of the three driven links 200-1, 200-2, and 200-3 may be the same or may be different from each other. However, the lengths of the three driving links 300-1, 300-2, and 300-3 may be the same, and the lengths of the three driven links 200-1, 200-2, and 200-3 may be different from each other. The length of the driven link 200 refers to the length of the second arm 220 or the fourth arm 240.

Figure 14:
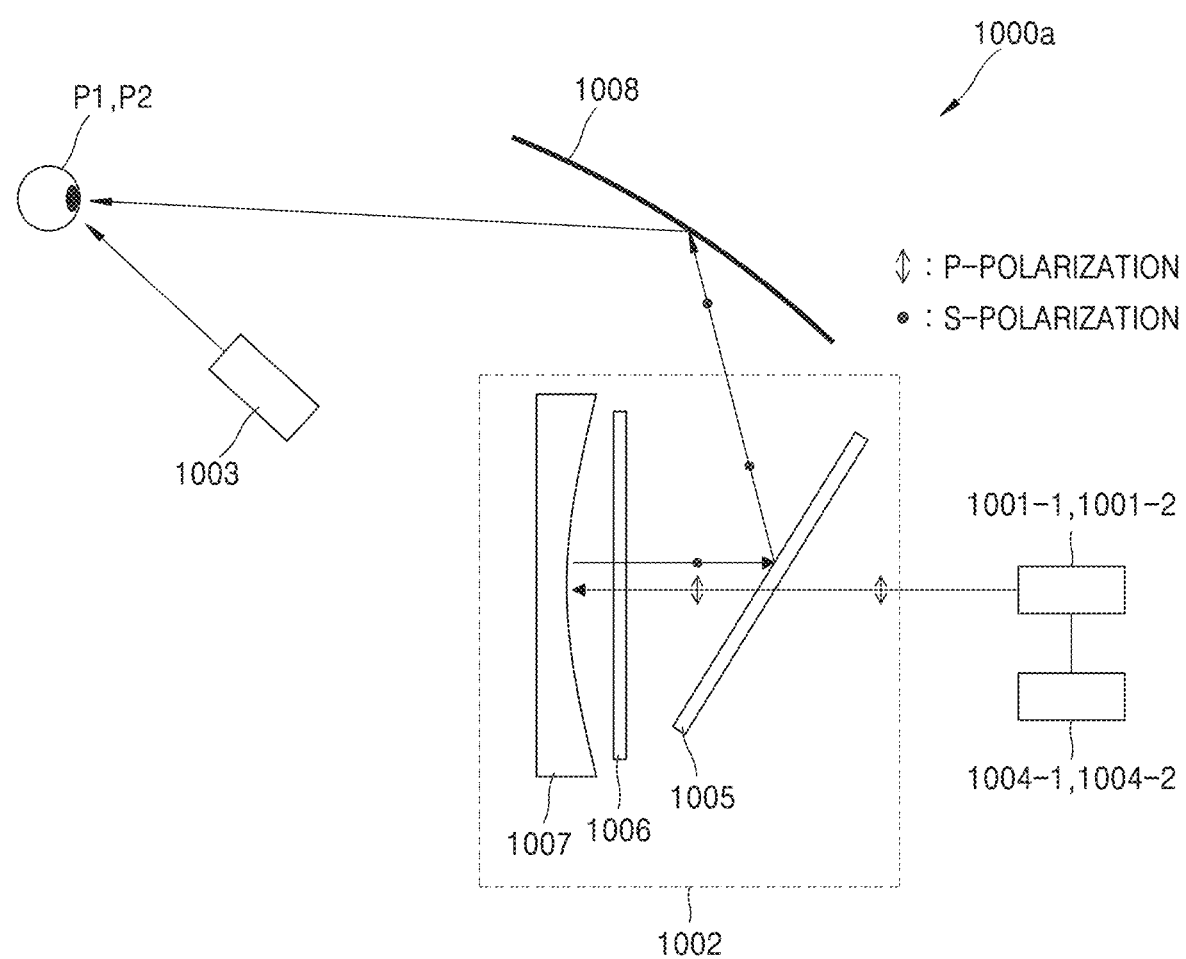
FIG. 14 is a side view of a configuration of a head-up display system according to an embodiment.

FIG. 14 is a schematic configuration diagram of a head-up display apparatus 1000a as an example of the display apparatus 1000, according to an embodiment. Referring to FIG. 14, the image generating apparatuses (light sources) 1001-1 and 1001-2 emit first polarized light including image information. The optical system 1002 provides image lights of the (first and second) image generating apparatus (first and second light sources) 1001-1 and 1001-2 to the pupils P1 and P2 of a driver (observer). As an example, the optical system 1002 may include a polarization beam splitter (PBS) 1005, a wavelength plate 1006, and a mirror 1007. The PBS 1005 is provided on a traveling path of the first polarized light emitted from the image generating apparatuses 1001-1 and 1001-2 to transmit the first polarized light. The wavelength plate 1006 is provided on a traveling path of light transmitted through the PBS 1005, and transforms and transmits a phase of the light transmitted through the PBS 1005. The mirror 1007 reflects the light transmitted through the PBS 1005 and the wavelength plate 1006 and transmits the light to the wavelength plate 1006 again, so that the light is directed to the PBS 1005.

The image generating apparatuses 1001-1 and 1001-2 may include a display panel that generates light including image information and an optical system that diffuses light from the display panel. The image generating apparatuses 1001-1 and 1001-2 may emit the first polarized light. For example, first polarization may be horizontal polarization (P-polarization). However, the disclosure is not limited thereto, and the first polarization may be vertical polarization (S-polarization). The image generating apparatuses 1001-1 and 1001-2 may emit left-eye image light and right-eye image light, respectively. Accordingly, a stereoscopic 3D image in which a left-eye image and a right-eye image are combined may be provided to the driver (observer). In addition, the image generating apparatuses 1001-1 and 1001-2 may generate a computer generative hologram (CGH) image. For example, the image generating apparatuses 1001-1 and 1001-2 may include a display panel that generates the CGH image.

The PBS 1005 may transmit light from the image generating apparatuses 1001-1 and 1001-2. For example, the PBS 1005 may transmit the first polarized light generated by the image generating apparatuses 1001-1 and 1001-2. For example, as shown in FIG. 14, the PBS 1005 may transmit horizontally polarized light (P-polarized light) emitted from the image generating apparatuses 1001-1 and 1001-2. An incident surface of the PBS 1005 with respect to the light emitted from the image generating apparatuses 1001-1 and 1001-2 may be inclined at a certain angle with respect to a traveling path of the light.

The wavelength plate 1006 may change the phase of incident light and transmit the incident light. For example, the phase of first polarized light emitted from the image generating apparatuses 1001-1 and 1001-2 and transmitted through the PBS 1005 may be converted by 90 degrees. For example, when the first polarized light emitted from the image generating apparatuses 1001-1 and 1001-2 is horizontally polarized light (P-polarized light), the light transmitted through the wavelength plate 1006 may be converted into circularly polarized light. For example, the wavelength plate 1006 may include a quarter wavelength plate (QWP).

For example, the mirror 1007 may include a concave mirror. In this case, light reflected by the mirror 1007 may be focused on the focal point of the mirror 1007. For example, the mirror 1007 may include either an aspheric mirror or a freeform curved mirror. However, the disclosure is not limited thereto, and the mirror 1007 may include a spherical mirror. FIG. 14 illustrates that the wavelength plate 1006 and the mirror 1007 are apart from each other, but the disclosure is not limited thereto. For example, the wavelength plate 1006 and the mirror 1007 may be integrally formed. The mirror 1007 may reflect light transmitted through the wavelength plate 1006 and transmit the light to the wavelength plate 1006 again. When the light passes through the wavelength plate 1006 again, the phase of the light may be converted again by the wavelength plate 1006. For example, the phase of light reflected by the mirror 1007 may be converted by 90 degrees as the light passes through the wavelength plate 1006. For example, when the first polarized light emitted from the image generating apparatuses 1001-1 and 1001-2 is horizontally polarized light (P-polarized light), the first polarized light may be converted into circularly polarized light by passing through the wavelength plate 1006, and the circularly polarized light may be reflected by the mirror 1007 and transmitted again through the wavelength plate 1006 to be converted into second polarized light different from the first polarized light. For example, second polarization may be vertical polarization (S-polarization). In this way, the first polarized light (e.g., P-polarized light) emitted from the image generating apparatuses 1001-1 and 1001-2 may be converted into the second polarized light (e.g., S-polarized light) by passing through the wavelength plate 1006 twice. However, the disclosure is not limited thereto. When the first polarized light emitted from the image generating apparatuses 1001-1 and 1001-2 is vertically polarized light (S-polarized light), the second polarized light may be horizontally polarized light (P-polarized light). For example, a polarization axis of the first polarization and a polarization axis of the second polarization may be perpendicular to each other.

As described above, the first polarized light (e.g., P-polarized light) emitted from the image generating apparatuses 1001-1 and 1001-2 may sequentially pass through the PBS 1005 and the wavelength plate 1006. The light sequentially transmitted through the PBS 1005 and the wavelength plate 1006 may be reflected by the mirror 1007 to pass through the wavelength plate 1006 again, and converted into the second polarized light (e.g., S-polarized light) to be directed to the PBS 1005. The second polarized light (e.g., S-polarized light) is finally reflected by the PBS 1005 and directed to a vehicle windshield 1008. The second polarized light (e.g., S-polarized light) may be reflected by the vehicle windshield 1008 and directed to the driver's pupils P1 and P2. For example, a left eye image generated by the first image generating apparatus 1001-1 may be provided to the left pupil P1. In addition, a right-eye image generated by the second image generating apparatus 1001-2 may be provided to the right pupil P2. Accordingly, the driver may recognize an image generated by the image generating apparatuses 1001-1 and 1001-2. In addition, a change in the position of the driver's pupils P1 and P2 is detected by the eye-tracking sensor 1003, wherein a controller calculates a position adjustment amount of the image generating apparatuses 1001-1 and 1001-2 based on the change in the position of the driver's pupils P1 and P2, and drives the first and second multi-DOF moving stages 1004-1 and 1004-2 based on the calculated position adjustment amount. Accordingly, even if the position of the driver's pupils P1 and P2 is changed, light from the image generating apparatuses 1001-1 and 1001-2 may be transmitted to the driver's pupils P1 and P2 at the changed position.

Figure 15:
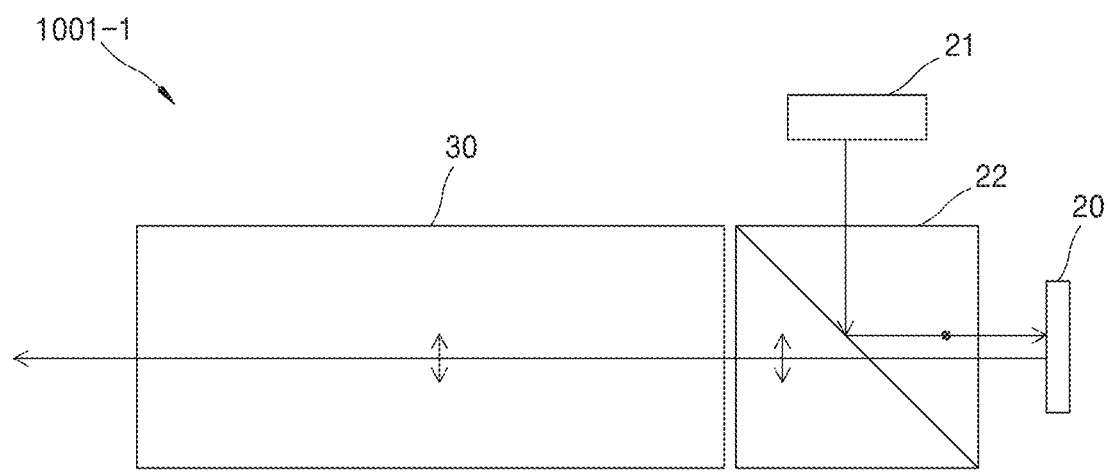
FIG. 15 is a side view of an example configuration of an image generating apparatus of FIG. 14.

FIG. 15 is a side view of an example configuration of the image generating apparatus 1001-1 of FIG. 14. The example configuration of the image generating apparatus 1001-1 of FIG. 15 may also be applied to the image generating apparatus 1001-2 of FIG. 14. Referring to FIG. 15, the image generating apparatus 1001-1 may include a light source 21, a display panel 20 that reflects light from the light source 21 to generate light including image information, a beam splitter 22 provided between the light source 21 and the display panel 20 to reflect light from the light source 21 and transmit the light to the display panel 20 and transmit light from the display panel 20, and a projection optical system 30 that projects light from the display panel 20.

The light source 21 may include, but is not limited to, an LED device that emits white light. The light source 21 may include a laser diode that emits laser light. In this case, the light emitted from the light source 21 may have coherence. The light source 21 may emit monochromatic light in a visible light area. For example, the light source 21 may be an optical element (e.g., an LED) that emits any one of red light, green light, and blue light. In addition, the light source 21 may include a plurality of optical elements including a first optical element that emits red light, a second optical element that emits green light, and a third optical element that emits blue light. The first, second, and third optical elements that emit light of different wavelengths included in the light source 21 may be independently driven with a predetermined time interval. Accordingly, red light, green light, and blue light may be sequentially emitted from the light source 21.

The display panel 20 may convert light emitted from the light source 21 into light including image information. For example, the display panel 20 may include any one of a liquid crystal on silicon (LCoS), a digital micromirror display (DMD), and a liquid crystal display (LCD) panel. For example, when the display panel 20 is an LCoS or an LCD, light including image information generated by the display panel 20 may be first polarized light. For example, the first polarization may be horizontal polarization (P-polarization). However, the disclosure is not limited thereto, and the first polarization may be vertical polarization (S-polarization). For example, when the display panel 20 is a DMD, a separate polarizing plate for converting the polarization of light reflected by the display panel 20 may be further included in an image generating apparatus 1000-1.

The beam splitter 22 may be provided when the display panel 20 is of a reflective type. For example, when the display panel 20 is an LCoS or DMD, the beam splitter 22 may be provided between the light source 21 and the display panel 20. The beam splitter 22 may include a PBS that transmits or reflects light according to the type of polarization. The beam splitter 22 may include an incident surface inclined at a certain angle with respect to a traveling path of light emitted from the light source 21. At least a portion of the light from the light source 21 may be reflected by this incident surface to proceed toward the display panel 20. In this case, light reflected by the incident surface of the beam splitter 22 and directed to the display panel 20 may be, for example, vertically polarized light (S-polarized light). For example, when the display panel 20 is an LCoS, the vertically polarized light (S-polarized light) proceeding toward the display panel 20 may be reflected by the display panel 20 and converted into horizontally polarized light (P-polarized light). In addition, when the display panel 20 is a DMD, a separate polarizing plate for converting incident light into horizontal polarized light (P-polarized light) may be provided between the beam splitter 22 and the display panel 20. The horizontally polarized light (P-polarized light) from the display panel 20 may pass through the beam splitter 22.

Unlike the image generating apparatus 1001-1 shown in FIG. 15, when the display panel 20 is a transmissive type, the beam splitter 22 may not be included in the image generating apparatus 1001-1. In this case, the light source 21, the display panel 20, and the projection optical system 30 may be provided on a straight line.

Meanwhile, the display panel 20 may form an image near the display panel 20. The image formed near the display panel 20 may be enlarged through the projection optical system 30. The projection optical system 30 may include a plurality of lenses. The image formed by the display panel 20 may be enlarged through a plurality of lenses included in the projection optical system 30 to be formed in the head-up display apparatus 1000. For example, as shown in FIG. 1, the image generated by the display panel 20 may be enlarged through the projection optical system 30 to be imaged on the pupils P1 and P2.

Figure 16:
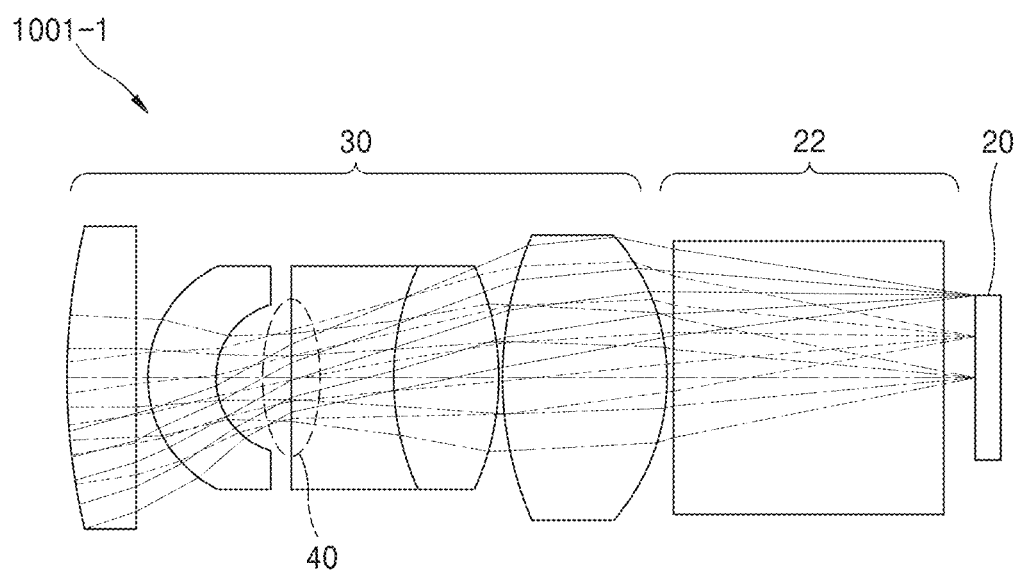
FIG. 16 is a side view of an example configuration of the image generating apparatus of FIG. 14.

FIG. 16 is a side view schematically illustrating an example configuration of the image generating apparatus 1001-1 of FIG. 14. In FIG. 16, the light source 21 of FIG. 15 is omitted for convenience of description.

Referring to FIG. 16, light from the display panel 20 may pass through the beam splitter 22 and the projection optical system 30. For example, the projection optical system 30 may include a lens group including a plurality of lenses. For example, the lens group included in the projection optical system 30 may include a projector lens group for imaging an image in the head-up display apparatus 1000. In order to diffuse the light from the display panel 20, the shape of the plurality of lenses may be properly designed. Accordingly, an image caused by the light from the display panel 20 may be enlarged. In addition, an iris 40 may be provided between the plurality of lenses. The iris 40 may block a portion of the light emitted from the display panel 20.

A miniaturized multi-DOF moving stage capable of adjusting the position of a light source may be implemented by employing three driven links connected at intervals from each other with an end effector. A multi-DOF moving stage capable of high-speed and precise driving may be implemented by employing a parallelogram-shaped driven link that may be manufactured by an origami method. The rigidity of the driven link may be enhanced while minimizing a weight increase of the driven link by making at least one of four arms forming the driven link into a hollow prism shape. A compact display apparatus capable of providing a virtual image may be implemented by employing the above-described multi-DOF moving stage.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A multi-degree of freedom (DOF) moving stage comprising:
    an end-effector;
    three driven links pivotably connected to the end-effector at angular intervals from each other, wherein an interval between a first driven link and a second driven link of the three driven links is 90 degrees, and an interval between the first driven link and a third driven link of the three driven links is 90 degrees;
    three driving links pivotably connected to the three driven links, respectively; and
    three actuators configured to drive the three driving links, respectively,
    wherein each of the three driven links respectively comprises:
        a first arm, a second arm, a third arm and a fourth arm arranged at intervals; and
        a flexible member that connects the first, second, third and fourth arms to each other in a parallelogram shape across the intervals, that forms pivotable joints at the intervals, and that is pivotably connected to the end-effector,
    wherein for each of the three driven links, the first arm is pivotably connected to the end-effector, the third arm facing the first arm is pivotably connected to the respective driving link, and the second arm and the fourth arm have a hollow prism shape,
    wherein each of the second arm and the fourth arm comprises a first plate member, a second plate member and a third plate member that are arranged on the flexible member, and
    wherein the flexible member comprises a first bendable portion that connects the first plate member and the second plate member, and a second bendable portion that connects the first plate member and the third plate member.

2. The multi-DOF moving stage of claim 1, wherein at least one of the three driving links has a length different from a length of each of the other two driving links.

3. The multi-DOF moving stage of claim 1, wherein, from among the three driving links, two driving links are arranged at a 180-degree interval from each other,
    wherein each of the two driving links has a first length, and
    wherein the other driving link of the three driving links has a second length different from the first length.

4. The multi-DOF moving stage of claim 3, wherein each of the three driven links has a same length.

5. The multi-DOF moving stage of claim 1, wherein at least one of the three driven links has a length different from a length of each of the other two driven links.

6. The multi-DOF moving stage of claim 1, wherein the intervals between adjacent ones of the first, second, third and fourth arms have a linear strip shape.

7. The multi-DOF moving stage of claim 1, wherein the intervals between adjacent ones of the first, second, third and fourth arms have an uneven shape.

8. The multi-DOF moving stage of claim 1, wherein the flexible member comprises an elastic member.

9. The multi-DOF moving stage of claim 1, wherein the first driven link is configured to pivot at a first axis parallel to a first direction, the second driven link is configured to pivot at a second axis parallel to a second direction, and the third driven link is configured to pivot at a third axis parallel to the second direction, and wherein the second direction is perpendicular to the first direction.

10. A multi-degree of freedom (DOF) moving stage comprising:
    an end-effector;
    a plurality of driven links, each of the plurality of driven links respectively comprising:
        a first arm, a second arm, a third arm, and a fourth arm arranged at intervals; and
        a flexible member that connects the first, second, third and fourth arms to each other in a parallelogram shape across the intervals, that forms pivotable joints at the intervals, and that is pivotably connected to the end-effector;
    a plurality of driving links pivotably connected to the plurality of driven links, respectively; and
    a plurality of actuators configured to drive the plurality of driving links, respectively,
    wherein at least one of the first, second, third and fourth arms of at least one of the plurality of driven links has a hollow prism shape,
    wherein the at least one of the first, second, third and fourth arms comprises a first plate member, a second plate member and a third plate member that are arranged on the flexible member, and
    wherein the flexible member comprises a first bendable portion that connects the first plate member and the second plate member, and a second bendable portion that connects the first plate member and the third plate member.

11. The multi-DOF moving stage of claim 10, wherein for each of the plurality of driven links, the first arm is pivotably connected to the end-effector, the third arm facing the first arm is pivotably connected to the respective driving link, and the second arm and the fourth arm have the hollow prism shape.

12. The multi-DOF moving stage of claim 10, wherein a length of at least one of the plurality of driving links is different from a length of each of the other two driving links.

13. The multi-DOF moving stage of claim 12, wherein each of the plurality of driven links has a same length.

14. The multi-DOF moving stage of claim 10, wherein the plurality of driven links comprise three driven links connected to the end-effector, and the plurality of driving links comprise three driving links respectively connected to the three driven links, and
    wherein an interval between a first driven link and a second driven link of the three driven links is 90 degrees, and an interval between the first driven link and a third driven link of the three driven links is 90 degrees.

15. A display apparatus comprising:
    a first light source configured to provide left-eye image light;
    a first multi-degree of freedom (DOF) moving stage configured to adjust a position of the first light source;
    a second light source configured to provide right-eye image light;
    a second multi-DOF moving stage configured to adjust a position of the second light source; and
    an optical system configured to provide the left-eye image light and the right-eye image light to a left eye and a right eye of a viewer, respectively, wherein the first multi-DOF moving stage and the second multi-DOF moving stage each comprise:
an end-effector on which a light source is mounted;
three driven links pivotably connected to the end-effector at angular intervals from each other, wherein an interval between a first driven link and a second driven link of the three driven links is 90 degrees, and an interval between the first driven link and a third driven link of the three driven links is 90 degrees;
three driving links pivotably connected to the three driven links, respectively; and
three actuators configured to drive the three driving links, respectively,
wherein each of the three driven links respectively comprises:
a first arm, a second arm, a third arm and a fourth arm arranged at intervals; and
a flexible member that connects the first, second, third and fourth arms to each other in a parallelogram shape across the intervals, that forms pivotable joints at the intervals, and that is pivotably connected to the end-effector,
wherein for each of the three driven links, the first arm is pivotably connected to the end-effector, the third arm facing the first arm is pivotably connected to the respective driving link, and the second arm and the fourth arm have a hollow prism shape,
wherein each of the second arm and the fourth arm comprises a first plate member, a second plate member and a third plate member that are arranged on the flexible member, and
wherein the flexible member comprises a first bendable portion that connects the first plate member and the second plate member, and a second bendable portion that connects the first plate member and the third plate member.

16. The display apparatus of claim 15, wherein for each of the first multi-DOF moving stage and the second multi-DOF moving stage, at least one of the three driving links has a length different from a length of each of the other two driving links.

17. The display apparatus of claim 15, wherein for each of the first multi-DOF moving stage and the second multi-DOF moving stage, two driven links of the three driven links are arranged in a first axis direction, and
wherein the two driven links of the first multi-DOF moving stage and the two driven links of the second multi-DOF moving stage are arranged adjacent to each other.

* * * * *